United States Patent
Lin et al.

(10) Patent No.: US 8,108,961 B2
(45) Date of Patent: Feb. 7, 2012

(54) BROOM ASSEMBLY

(75) Inventors: Chang-I Lin, Taoyuan County (TW);
Ming-Che Ting, Hualien County (TW);
Hung-Chun Peng, Taoyuan County (TW)

(73) Assignee: Dikai International Enterprise Co., Ltd., Taoyuan County (TW)

( * ) Notice: Subject to any disclaimer, the term of this patent is extended or adjusted under 35 U.S.C. 154(b) by 296 days.

(21) Appl. No.: 12/393,444

(22) Filed: Feb. 26, 2009

(65) Prior Publication Data
US 2010/0183366 A1    Jul. 22, 2010

(30) Foreign Application Priority Data
Jan. 20, 2009    (TW) ................................ 98201053 U

(51) Int. Cl.
*A46B 5/00* (2006.01)
(52) U.S. Cl. .................... 15/159.1; 15/171; 15/176.1
(58) Field of Classification Search ................. 15/159.1, 15/171, 176.1, 144.1, 145
See application file for complete search history.

(56) References Cited

U.S. PATENT DOCUMENTS

| | | | | |
|---|---|---|---|---|
| 3,600,735 A * | 8/1971 | Jerabek | ...................... | 15/49.1 |
| 4,475,262 A * | 10/1984 | Downer | ...................... | 15/210.1 |
| 5,414,889 A * | 5/1995 | Sartori | ...................... | 15/159.1 |
| 5,551,115 A * | 9/1996 | Newville | ...................... | 15/172 |
| 7,083,120 B2 * | 8/2006 | Gilpatrick et al. | ...................... | 239/397 |

* cited by examiner

*Primary Examiner* — Shay Karls
(74) *Attorney, Agent, or Firm* — Rosenberg, Klein & Lee

(57) ABSTRACT

A broom assembly includes a head structure and a rod structure. The head structure includes a base having a coupling face formed with a reception chamber and an opening for access into the reception chamber, and a plurality of resilient ribs provided at the periphery confining the opening and extending inwardly and radially toward a center axis of the opening. The rod structure includes a coupling member provided partially, rotatably and detachably within the reception chamber in the coupling face of the base. When the coupling member is detachably received within the reception chamber, the coupling member biases against and engages the resilient ribs so as to be prevented untimely disengaging from the base.

13 Claims, 5 Drawing Sheets

BROOM ASSEMBLY

This application claims the benefits of the Taiwan Patent Application Serial NO. 098201053 filed on Jan. 20, 2009, the subject matter of which is incorporated herein by reference.

BACKGROUND OF THE INVENTION

1. Field of the Invention

The present invention relates to a broom assembly, more particularly to a broom assembly including a head structure and a rod structure that is rotatable relative to and is adapted to be detached from the head structure with ease.

2. Description of the Prior Art

According to ROC (Republic of China) utility patent number M290028, a broom assembly is disclosed to include a head structure of a circular shape and a handgrip rod (consisting of an elongated rod and a handle) that is rotatable relative to the head structure. When the sweeper grips the handgrip rod and sweeps the floor, the head structure rotates relative to the handgrip rod and simultaneously cleans the floor.

In addition, the head structure includes a circular disc connected to the handgrip rod and a cleaning cloth attached to the circular disc via a retention ring disposed within the circular disc. After a period time of use and in case of replacing the old cleaning cloth with a new ones, the assembly of the retention ring and the cleaning cloth must be detached from the circular disc. It is very inconvenient to remove the cleaning cloth from the circular disc, because the retention ring must be removed first from the circular disc by using two hands. Then only, the circular disc can be detached from the handgrip rod and the old cleaning cloth is detached from the circular disc. Thus, the detachment of the head structure from the rod structure is complicated.

In FIG. 2 of the aforesaid utility patent, it can be observed that there are a lot of components between the connecting head I and the circular disc and the assembly thereof is complicated, thereby resulting in long assembly time and high manufacturing expense.

SUMMARY OF THE INVENTION

Therefore, the object of the present invention is to provide a broom assembly which includes lesser components and simpler structure so as to overcome the long assembly time and high manufacturing expense during the mass production of the prior art broom assembly.

The broom assembly of the present invention includes a head structure and a rod structure. The head structure includes a base and a plurality of resilient ribs. The base has a coupling face formed with a reception chamber and an opening for access into the reception chamber. The opening defines a center axis. The resilient ribs are provided at the periphery confining the opening, and extend inwardly and radially toward the center axis of the opening.

The rod structure includes a coupling member provided partially, rotatably and detachably within the reception chamber in the coupling face of the base so that when the coupling member is detachably received within the reception chamber, the coupling member biases against and engages the resilient ribs so as to be prevented untimely disengaging from the base.

As explained above, the broom assembly of the present invention does not include the circular disc of the prior art, thereby economizing the manufacturing expense when compared to the prior art technology. In addition, the rod structure includes an elongated handgrip rod and when it is desired to remove the handgrip rod from the head structure, the sweeper's leg only needs to step on the head structure while the hand grips on the top end of the handgrip rod. Afterward, the handgrip rod is swung to one lateral side of the head structure without removing the leg from the head structure so as to permit detachment of the handgrip rod from the head structure. It requires a smaller storage space for storing the broom assembly of the present invention since the handgrip rod is easily detached from the head structure.

Moreover, the engagement of the coupling member relative to the resilient ribs within the reception chamber is simple in structure, thereby economizing a relatively large amount of components and consequently lowers the assembly time and the manufacturing expense.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
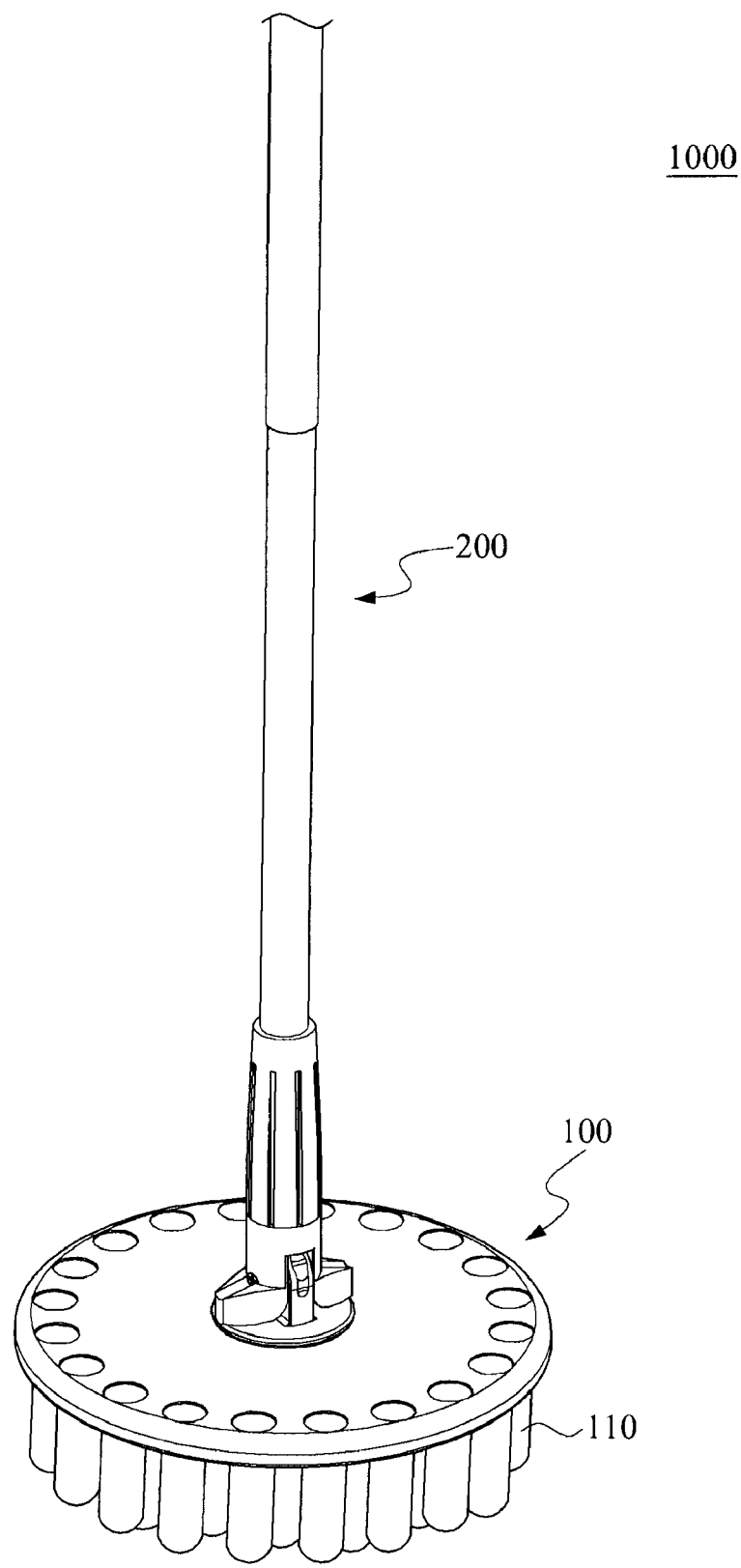
FIG. 1 is a perspective view of a broom assembly of the present invention.

FIG. 1 shows a perspective view of a broom assembly 1000 of the present invention to include a head structure 100 and a rod structure 200. The head structure 100 is circular in shape and includes a cleaning member 110 for sweeping the floor. The rod structure 200 is elongated and is connected to the head structure 100 such that the head structure 100 is rotatable relative to the rod structure 200 and that the rod structure 200 can be swung to one lateral side so as to be inclined relative to the head structure 100.

Figure 2:
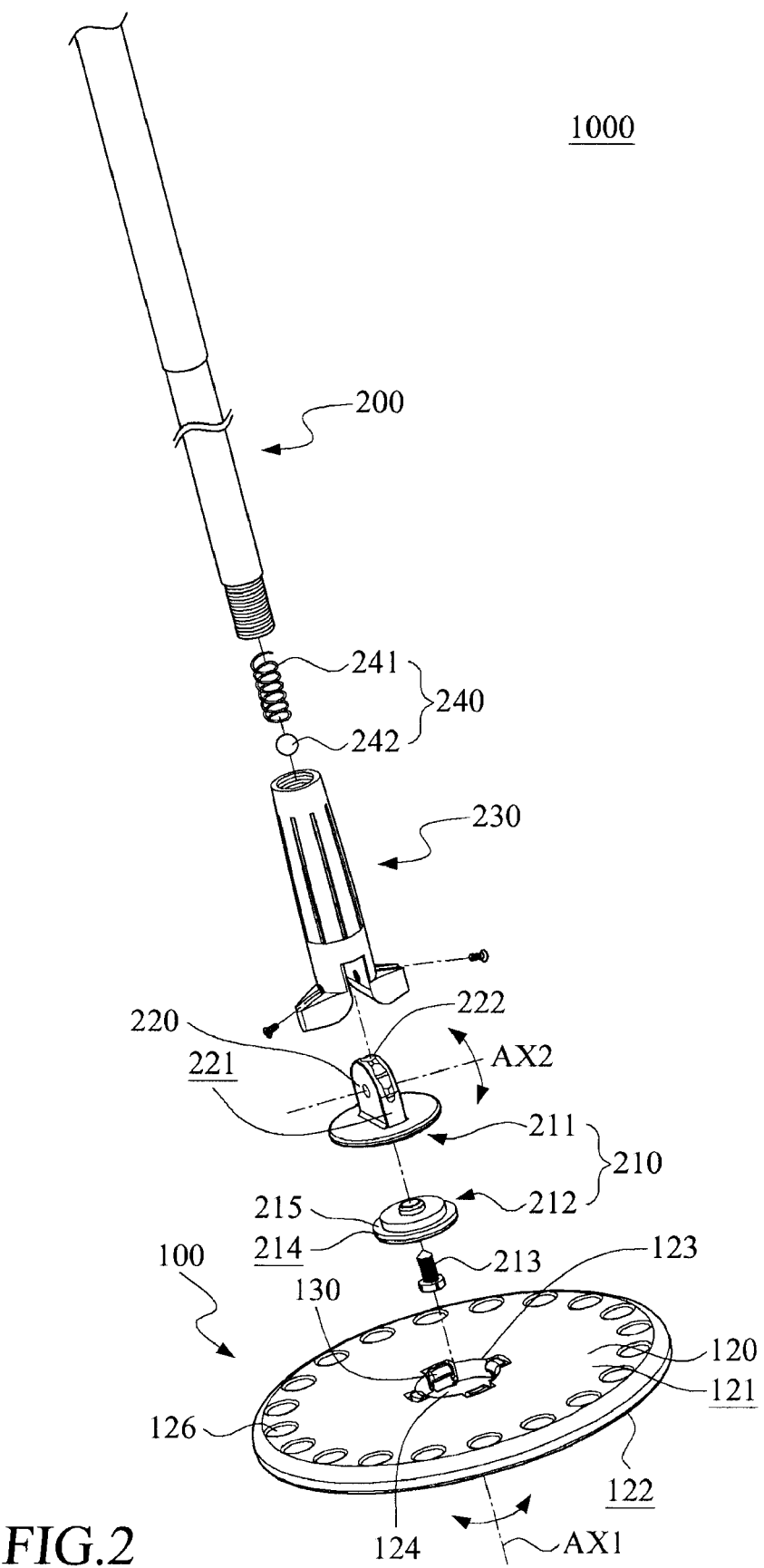
FIG. 2 is an exploded view of the broom assembly of the present invention, wherein a cleaning member is removed therefrom.
Figure 3:
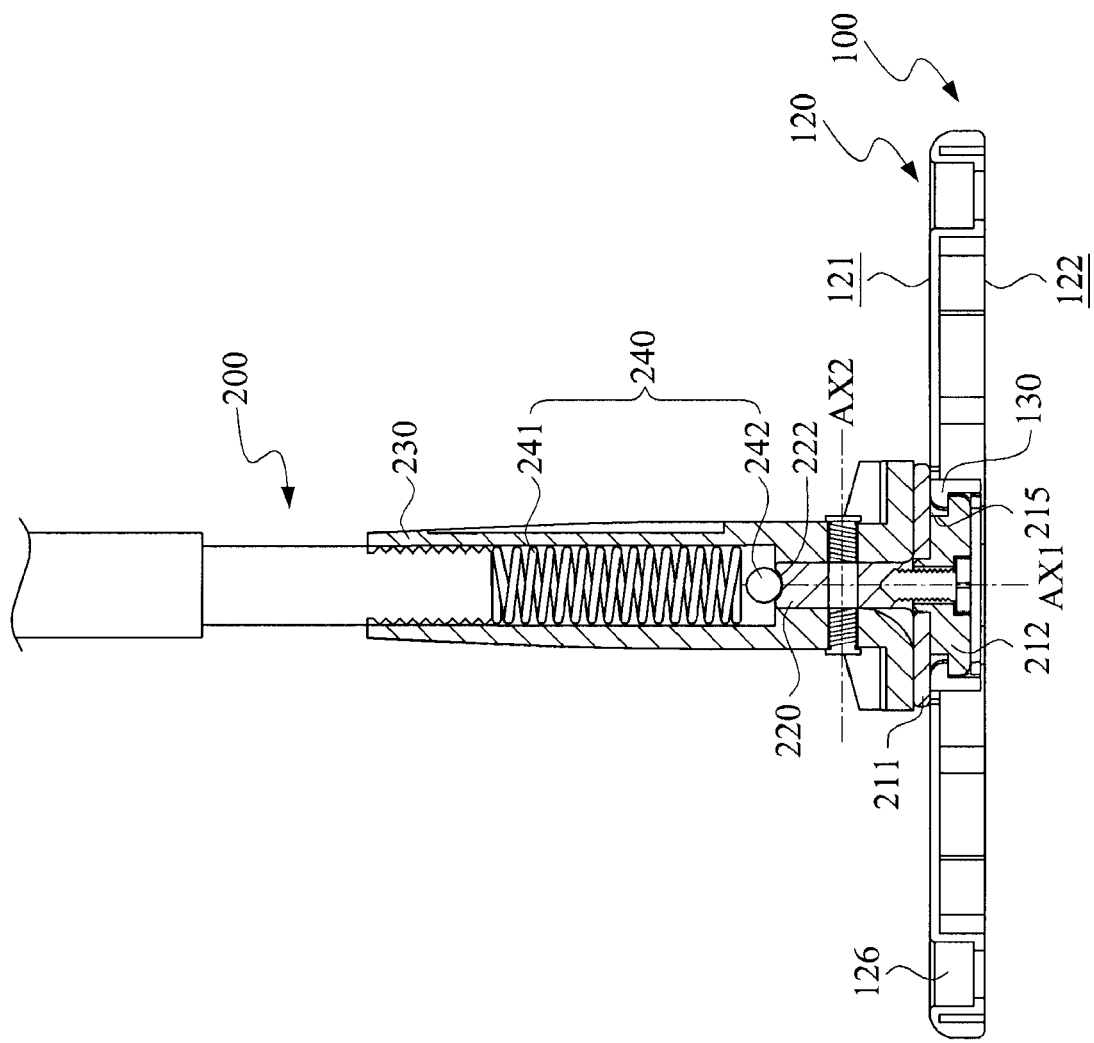
FIG. 3 shows is a fragmentary sectional view of the broom assembly of the present invention.

FIG. 2 is an exploded view of the broom assembly 1000 of the present invention, wherein the cleaning member 110 is removed therefrom. FIG. 3 shows is a fragmentary sectional view of the broom assembly 1000 of the present invention. As illustrated, the head structure 100 includes a base 120, a plurality of resilient ribs 130 and a cleaning member 110 (see FIG. 1). The base 120 is a circular disc having a coupling face 121 formed with a reception chamber 124 and an opening 123 for access into the reception chamber 124. The opening 123 defines a center axis AX1. The base 12 is further formed with a plurality of mounting holes 126 around the periphery thereof for mounting the cleaning member 110.

The resilient ribs 130 are integrally formed with the periphery confining the opening 123 in the base 120. Each resilient rib 130 has an axial section integrally formed with the peripheral wall confining the reception chamber 124 and a radial section extending from the axial section inwardly and radially toward the center axis AX1 of the opening 123 so that each rib is shaped like an inverted L hook. The base 120 and the ribs 130 are made from plastic materials, and an injection molding process is used for production of the same.

The cleaning member 110 is formed by combining several strips of clothing, which are inserted respectively through the mounting holes 126 in the base 120 so that the clothing strips are exposed from a cleaning face 122 opposite to the coupling face 121. In other embodiment, relatively thin clothing may serve as the cleaning member 110 and is attached to the cleaning face 122 of the base 120 for rubbing against the floor.

The rod structure 200 includes a coupling member 210, a pivot member 220, a hand-held rod 230 and a resilient position-limiting element 240. The coupling member 210 is circular in shape and is provided partially, rotatably about the center axis AX1 and detachably within the reception chamber 124 in the coupling face 121 of the base 120. The coupling member 210 has an axis co-axial with the center axis AX1 of the opening 123 in the base 120.

The coupling member 210 includes an upper coupler disc 211 attached to the coupling face 121 of the base 120, and has a diameter greater than that of the opening 123 in the base 129 and a lower coupler disc 212 disposed below the upper coupler disc 211 and received within the reception chamber 124 in the base 120. In this embodiment, the upper and lower coupler discs 211, 212 are separately formed and fastened together by a fastener screw 213.

Preferably, the lower coupler disc 212 is circular in shape, and has an annular flange 214 projecting radially and outwardly therefrom to define an engaging groove 215 in cooperation with the periphery confining the opening 123 in the base 120. The resilient ribs 130 engage the groove 215 to prevent untimely removal of the lower coupler disc 212 from the base 20.

Thus, when the coupling member 210 is received detachably in the reception chamber 124, the coupling member 210 biases against and engages the resilient ribs 130 so as to be prevented untimely disengaging from the base 120. Since the broom assembly 1000 of the present invention includes simple structure and has lesser components, the assembly time and the manufacturing expense thereof is lowered when compared to the prior art broom assembly.

The pivot member 220 projects upwardly from the coupling member 210. Alternately, the pivot member 220 can be integrally formed with the coupling member 210. The hand-held rod 230 is connected pivotally to the pivot member 220, and is rotatable about an axis AX2 that is perpendicular to the center axis AX1 of the opening 123.

The resilient position-limiting element 240 is provided within the hand-held rod 230, and exposes to an exterior from a distal end of the hand-held rod 230. The pivot member 220 has a curved top edge formed with a plurality of recesses 222 for receiving the position-limiting element 240 therein. The position-limiting element 240 is a spring-loaded member including a spring 241 attached to the hand-held rod 230 at one end thereof and a rolling ball 242 attached to the other end of the spring 241 and projecting outwardly from the distal end of the hand-held rod 230 so as to be received within a respective recess 222 in the pivot member 220, thereby retaining the hand-held rod 230 relative the pivot member 220.

Figure 4:
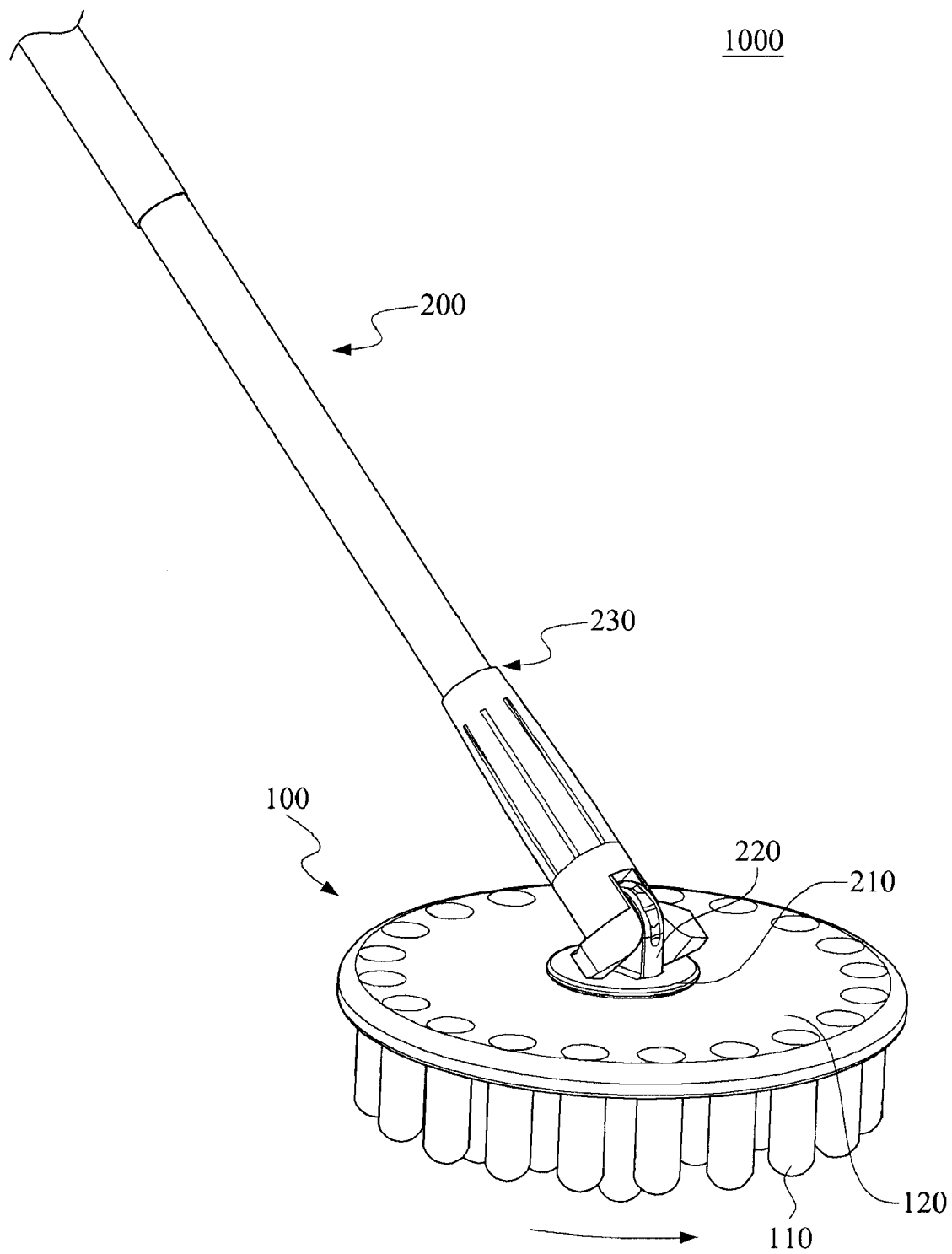
FIGS. 4 and 5 respectively show the broom assembly of the present invention in use.

FIG. 4 shows the broom assembly 1000 of the present invention in use. When a sweeper intends to sweep the floor by using the present broom assembly 1000, he is to grip the rod structure 200 and swung the same to a lateral side of the head structure 100, thereby disposing the rod structure 200 to be inclined relative to the head structure 100. In other words, the sweeper can rotate the hand-held rod 230 about the pivot member 220 so as to push the head structure 100 to contact the floor.

When the sweeper moves the rod structure 200 reciprocally for sweeping the floor, the head structure 100 rotates relative to the floor (the base 120 rotates relative to the coupling member 210), thereby cleaning the floor effectively.

Figure 5:
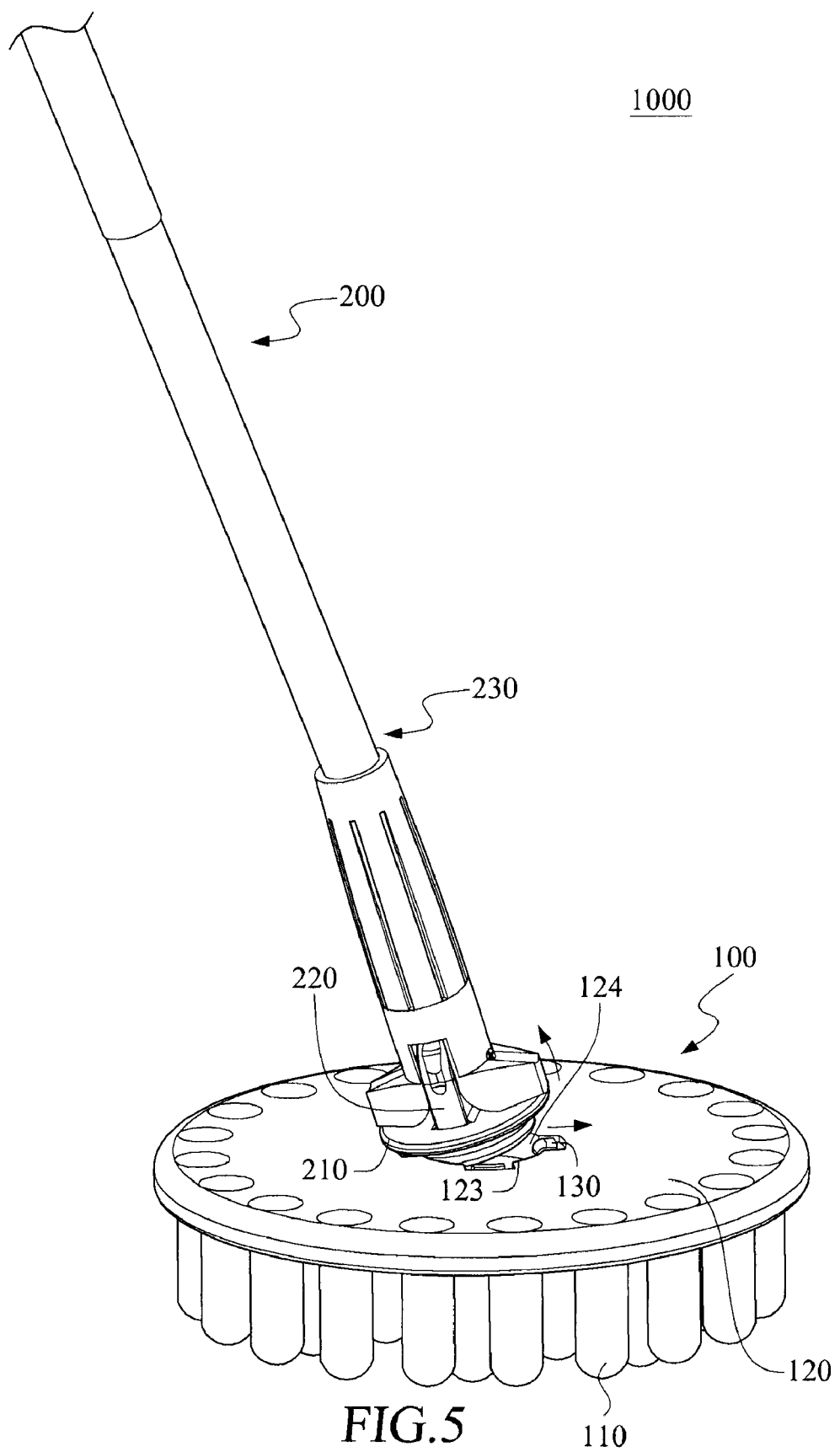

FIG. 5 illustrates another view of the broom assembly 1000 of the present invention in use. When it is desired to replace the old cleaning member 110 with new ones, the sweeper can simply and forcibly turn the coupling member 210 relative to the base 120, which action biases the coupling member 210 against the resilient ribs 130, thereby releasing the coupling member 210 toward the opening 123 of the reception chamber 124. In the same manner, in case of attaching the rod structure 200 to the head structure 100, the sweeper must align the coupling member 210 with the opening 123 and presses the coupling member 210 downward against the resilient ribs 130. The coupling member 210 will be received with the reception chamber 124 upon retraction and restoration of the resilient ribs 130.

As explained above, the rod structure 200 of the broom assembly of the present invention does not include the circular disc of the prior art, thereby economizing the manufacturing expense when compared to the prior art technology. In addition, the rod structure 200 includes an elongated handgrip rod 230 and when it is desired to remove the handgrip rod 230 from the head structure 100, the sweeper's leg only needs to step on the head structure 100 while the hand grips on the top end of the handgrip rod 230. Afterward, the handgrip rod 230 is forcibly swung to one lateral side of the head structure 100 without removing the leg from the head structure 100 to permit detachment of the handgrip rod 230 from the head structure 100. It requires a smaller storage space for storing the broom assembly of the present invention since the handgrip rod 230 is easily detached from the head structure.

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A broom assembly comprising:
   a head structure including
      a base having a coupling face formed with a reception chamber and an opening for access into said reception chamber, said opening defining a center axis, and
      a plurality of resilient ribs provided at the periphery confining said opening and extending inwardly and radially toward said center axis of said opening; and
   a rod structure including
      a hand-held rod provided with a resilient position-limiting element, which is exposed to an exterior from a distal end of said hand-held rod,
      a coupling member provided partially, rotatably and detachably within said reception chamber in said coupling face of said base, said coupling member further being coupled pivotally to said hand-held rod via said resilient position-limiting element, wherein when said coupling member is detachably received within said reception chamber, said coupling member defining a radial engaging groove retentively clipped by said resilient ribs so as to prevent untimely disengaging from said base.

2. The broom assembly according to claim 1, wherein said coupling member is circular in shape, and has an annular flange projecting radially and outwardly therefrom to define said engaging groove in cooperation with the periphery confining said opening in said base, said resilient ribs engaging said groove to prevent untimely removal of said coupling member from said base.

3. The broom assembly according to claim 1, wherein said coupling member is circular in shape.

4. The broom assembly according to claim 1, wherein said coupling member includes an upper coupler disc attached to said coupling face of said base, and having a diameter greater than that of said opening in said base and a lower coupler disc disposed below said upper coupler disc and received within said reception chamber in said base.

5. The broom assembly according to claim 4, wherein said lower coupler disc is circular in shape, and has an annular flange projecting radially and outwardly therefrom to define said engaging groove in cooperation with the periphery confining said opening in said base, said resilient ribs engaging said engaging groove to prevent untimely removal of said lower coupler disc from said base.

6. The broom assembly according to claim 1, wherein said rod structure further includes a pivot member projecting upwardly from said coupling member, and said hand-held rod connected pivotally to said pivot member via said resilient position-limiting element.

7. The broom assembly according to claim 6, wherein said pivot member is formed with a recess for receiving said resilient position-limiting element therein.

8. The broom assembly according to claim 7, wherein said resilient position-limiting element is a spring-loaded member including a spring attached to said hand-held rod at one end thereof and a rolling ball attached to the other end of said spring and projecting outwardly from said distal end of said hand-held rod so as to be received within said recess in said pivot member.

9. The broom assembly according to claim 1, wherein said base is rotatable about the center axis of said opening, said coupling member having an axis co-axial with the center axis of said opening.

10. The broom assembly according to claim 1, wherein said base is circular in shape.

11. The broom assembly according to claim 1, wherein said base has a cleaning face opposite to said coupling face.

12. The broom assembly according to claim 11, further comprising a cleaning member attached to said cleaning face of said base.

13. The broom assembly according to claim 12, wherein said cleaning member is formed by combining several strips of clothing.

\* \* \* \* \*